United States Patent
Ahn et al.

(10) Patent No.: US 10,425,942 B2
(45) Date of Patent: Sep. 24, 2019

(54) METHOD AND DEVICE FOR TRANSMITTING UPLINK IN UNLICENSED BAND

(71) Applicant: LG ELECTRONICS INC., Seoul (KR)

(72) Inventors: Joonkui Ahn, Seoul (KR); Seonwook Kim, Seoul (KR); Hanbyul Seo, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/735,696

(22) PCT Filed: Jun. 20, 2016

(86) PCT No.: PCT/KR2016/006537
§ 371 (c)(1),
(2) Date: Dec. 12, 2017

(87) PCT Pub. No.: WO2016/208927
PCT Pub. Date: Dec. 29, 2016

(65) Prior Publication Data
US 2019/0090240 A1   Mar. 21, 2019

Related U.S. Application Data

(60) Provisional application No. 62/182,629, filed on Jun. 21, 2015, provisional application No. 62/267,928, filed on Dec. 16, 2015.

(51) Int. Cl.
*H04W 72/04* (2009.01)
*H04L 1/18* (2006.01)
*H04W 74/08* (2009.01)

(52) U.S. Cl.
CPC .......... *H04W 72/0453* (2013.01); *H04L 1/18* (2013.01); *H04W 72/0413* (2013.01); *H04W 74/0808* (2013.01)

(58) Field of Classification Search
CPC ......... H04W 72/0453; H04W 72/1215; H04W 52/06; H04W 74/0808; H04W 56/0005; H04W 24/08
See application file for complete search history.

(56) References Cited

U.S. PATENT DOCUMENTS

| | | | |
|---|---|---|---|
| 2015/0049712 A1* | 2/2015 | Chen ................. | H04W 72/1215 370/329 |
| 2015/0092703 A1* | 4/2015 | Xu .......................... | H04L 5/003 370/329 |

(Continued)

FOREIGN PATENT DOCUMENTS

| | | |
|---|---|---|
| KR | 10-2011-0139960 A | 12/2011 |
| WO | WO 2014/111309 A1 | 7/2014 |

(Continued)

OTHER PUBLICATIONS

LG Electronics, "Candidate solutions for LAA operation", R1-144042, 3GPP TSG RAN WG1 Meeting #78bis, Ljubljana, Slovenia, Oct. 6-10, 2014, Total 6 pages.

*Primary Examiner* — Chi Ho A Lee
(74) *Attorney, Agent, or Firm* — Birch, Stewart, Kolasch & Birch, LLP

(57) ABSTRACT

Provided are a method and a device for transmitting an uplink in an unlicensed band. The device checks for idle subpools by performing clear channel assessment (CCA) on a plurality of sub-pools in a main pool in an unlicensed band. The device transmits an uplink transmission block by using the idle sub-pools in the unlicensed band.

8 Claims, 9 Drawing Sheets

(56) References Cited

U.S. PATENT DOCUMENTS

| | | | |
|---|---|---|---|
| 2016/0135189 A1* | 5/2016 | Chandrasekhar | ............................ H04W 72/0453 370/329 |
| 2016/0302226 A1* | 10/2016 | Kim | ................... H04W 72/1289 |
| 2016/0309354 A1* | 10/2016 | Yerramalli | ............. H04W 24/08 |
| 2017/0048718 A1* | 2/2017 | Kim | .................. H04W 56/0005 |
| 2017/0238334 A1* | 8/2017 | Yang | ................. H04W 74/0816 370/336 |
| 2017/0339648 A1* | 11/2017 | Wang | ..................... H04W 52/06 |
| 2017/0366308 A1* | 12/2017 | Choi | ..................... H04L 1/1887 |
| 2018/0035318 A1* | 2/2018 | Liu | ............................ H04B 1/56 |
| 2018/0049241 A1* | 2/2018 | Heo | .................. H04W 74/0808 |
| 2018/0139701 A1* | 5/2018 | Wang | ................ H04W 72/0473 |

FOREIGN PATENT DOCUMENTS

| | | |
|---|---|---|
| WO | WO 2014/214401 A2 | 12/2014 |
| WO | WO 2015/037937 A1 | 3/2015 |

* cited by examiner

METHOD AND DEVICE FOR TRANSMITTING UPLINK IN UNLICENSED BAND

CROSS REFERENCE TO RELATED APPLICATIONS:

This application is the National Phase of PCT International Application No. PCT/KR2016/006537, filed on Jun. 20, 2016, which claims priority under 35 U.S.C. 119(e) to U.S. Provisional Application Nos. 62/182,629, filed on Jun. 21, 2015 and 62/267,928, filed on Dec. 16, 2015, all of which are hereby expressly incorporated by reference into the present application.

BACKGROUND OF THE INVENTION

Field of the invention

The present invention relates to wireless communication, and more particularly, to a method for uplink transmission in an unlicensed band, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for uplink transmission in an unlicensed band and a device using the same.

In an aspect, a method for uplink transmission in a wireless communication system is provided. The method includes receiving, by a wireless device, information regarding a main-pool for uplink transmission in an unlicensed band from a base station, determining, by the wireless device, an idle sub-pool by performing clear channel assessment (CCA) on a plurality of sub-pools in the main-pool in the unlicensed band, and transmitting, by the wireless device, an uplink transport block to the base station by using the determined idle sub-pool in the unlicensed band.

The method may further include randomly selecting, by the wireless device, a sub-pool for performing the CCA from the plurality of sub-pools.

In another aspect, a device for uplink transmission in a wireless communication system includes a transceiver configured to transmit and receive a radio signal, and a processor operatively coupled to the transceiver. The processor is configured to control the transceiver to receive information regarding a main-pool for uplink transmission in an unlicensed band from a base station, determine an idle sub-pool by performing clear channel assessment (CCA) on a plurality of sub-pools in the main-pool in the unlicensed band, and control the transceiver to transmit an uplink transport block to the base station by using the determined idle sub-pool in the unlicensed band.

In an environment where various communication protocols co-exist in an unlicensed band, interference can be mitigated.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
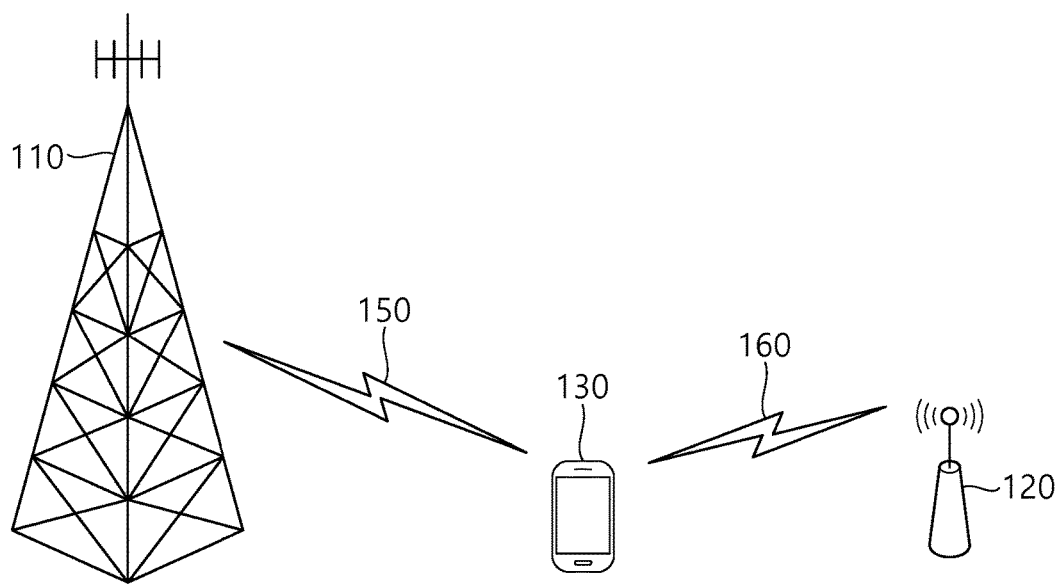
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Now, 3GPP LTE downlink (DL)/uplink (UL) scheduling and physical channels will be described.

In 3GPP LTE, the DL/UL scheduling is achieved in unit of subframes. The subframe includes a plurality of orthogonal frequency division multiplexing (OFDM) symbols, and a time required to transmit one subframe is defined as a transmission time interval (TTI). 1 TTI may be 1 ms. In 3GPP LTE, in case of a normal cyclic prefix (CP), one subframe includes 14 OFDM symbols, and in case of an extended CP, one subframe includes 12 OFDM symbols.

In 3GPP LTE, a DL physical channel may include a physical downlink control channel (PDCCH), a physical control format indicator channel (PCFICH), a physical hybrid-ARQ indicator channel (PHICH), and a physical downlink shared channel (PDSCH). A UL physical channel may include a physical uplink control channel (PUCCH) and a physical uplink shared channel (PUSCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for a UL hybrid automatic repeat request (HARQ). The ACK/NACK signal for UL data on a PUSCH transmitted by the wireless device is transmitted on the PHICH.

Control information transmitted through the PDCCH is referred to as downlink control information (DCI). The DCI may include resource allocation of the PDSCH (this is referred to as a DL grant) and resource allocation of a PUSCH (this is referred to as a UL grant).

Figure 2:
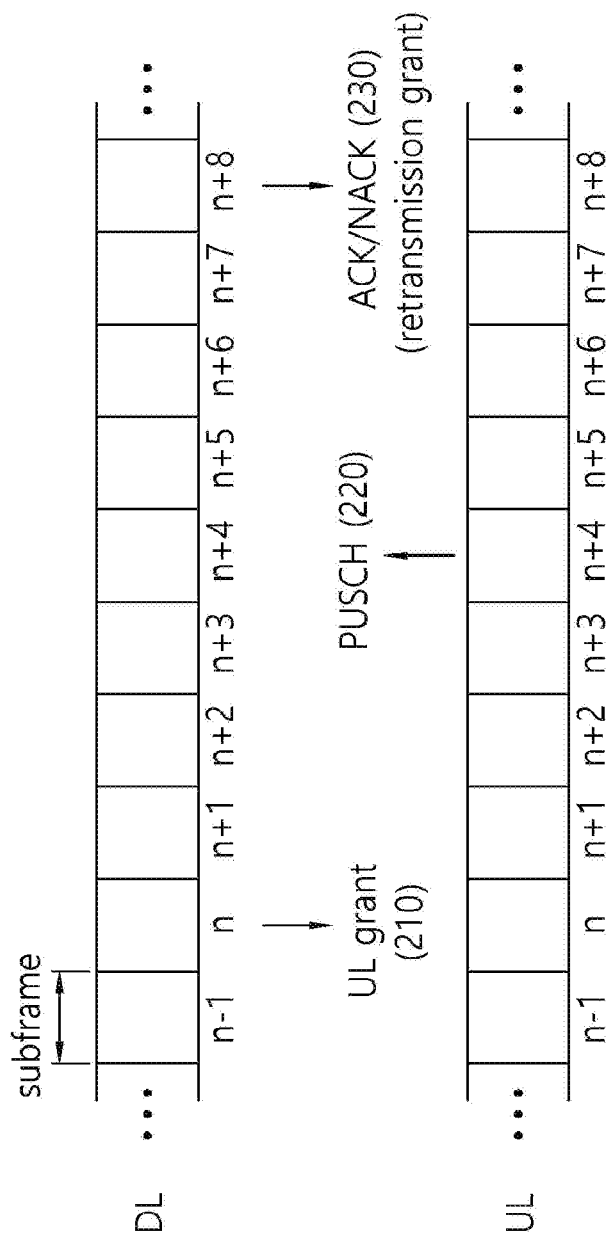
FIG. 2 shows an example of uplink (UL) transmission in 3rd generation partnership project (3GPP) LTE.

FIG. 2 shows an example of performing UL transmission in 3GPP LTE.

A UE receives a UL grant 210 having PUSCH resource allocation from a BS in a DL subframe. In addition, the UE transmits a UL transport block to the BS on a PUSCH 220 in a UL subframe n+k. In 3GPP LTE, it is fixed to k=4.

The UE receives an ACK/NACK signal 230 for the UL transport block on a PHICH in a DL subframe n+k+j. Herein, j=4. The ACK/NACK signal may be reception acknowledgement for the UL transport block. The ACK/NACK signal is an ACK signal when decoding of the UL transport block is successful, and is a NACK signal when the decoding of the UL transport block fails. If the ACK/NACK signal is NACK, the BS may transmit a retransmission grant for retransmission to the UE.

The UE may transmit a retransmission transport block to the BS on a PUSCH indicated by the retransmission grant in a UL subframe n+k+j+k.

As described above, in 3GPP LTE, UL transmission is achieved in the order of UL grant->PUSCH->ACK/NACK at fixed timing (e.g., an interval of 4 subframes). However, in an unlicensed band, since the UE first performs CCA and thereafter determines whether to transmit a signal, it may be difficult to maintain the timing.

Figure 3:
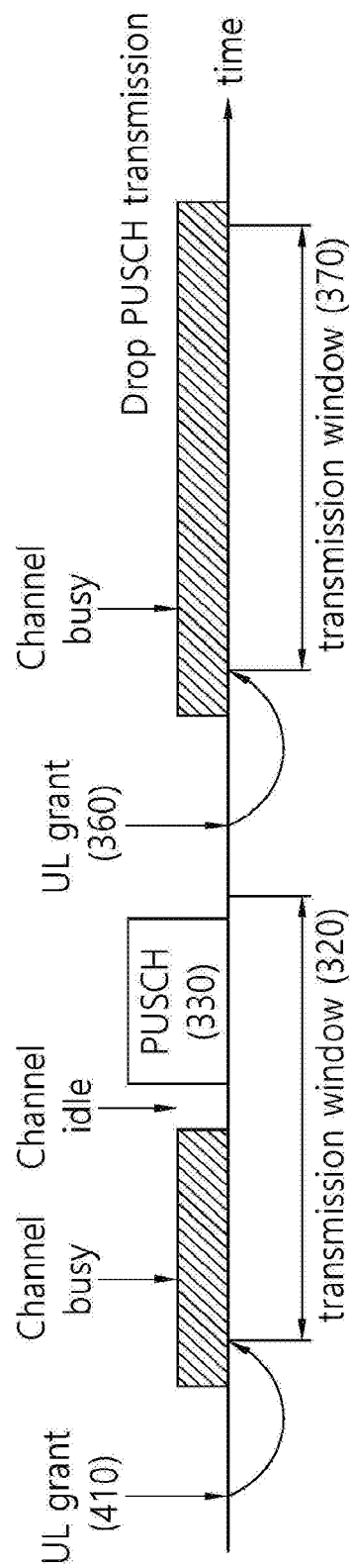
FIG. 3 shows UL transmission according to an embodiment of the present invention.

FIG. 3 shows UL transmission according to an embodiment of the present invention.

A transmission window in which a UE performs UL transmission may be configured. The UE performs CCA within the transmission window. If a channel is busy, whether the channel is idle is determined again after waiting until a backoff timer expires. If the channel is idle, UL transmission may be performed within the transmission window.

A BS may configure the transmission window through DCI or radio resource control (RRC) signaling. For example, the DCI may include not only PUSCH resource allocation but also configuration information of the transmission window.

The configuration of the transmission window may include information regarding a length and/or start point of the transmission window. Alternatively, the transmission window may be determined on the basis of a specific parameter (e.g., a cell ID, a UE ID, a subframe index, a radio frame index, a combination thereof, etc.).

Referring to FIG. 3, the UE receives a UL grant 410 from the BS. The UE attempts UL transmission within a transmission window 320 activated by the UL grant 310. If the channel is busy, it is waited for a backoff duration. If the channel is idle, a PUSCH 330 indicated by the UL grant 310 is transmitted within the transmission window 320.

The UE may start PUSCH transmission in a given transmission window, or may transmit a PUSCH only when the PUSCH transmission can be finished. If the PUSCH transmission cannot be complete within the transmission window, the PUSCH transmission may be dropped or delayed. For example, the UE may drop the PUSCH transmission if the channel is busy during a transmission window 370 activated by a UL grant 360.

The UE may start to perform CCA prior to a scheduled PUSCH transmission start point or a start point of a transmission window capable of transmitting the PUSCH. In addition, if a channel idle state is detected, the UE may transmit a reservation signal to reserve channel occupation so that other nodes cannot transmit signals. The reservation signal may be maintained until PUSCH transmission starts. Alternatively, if the channel idle state is detected also within the transmission window, the reservation signal may be transmitted until a start of a subframe boundary in which the PUSCH can be actually transmitted.

The UE may perform CCA only for a 'transmission band for transmitting the PUSCH' by the UE, and may determine whether the channel is idle. The BS may schedule PUSCH transmission by using the same transmission window to a UE group. A UE belonging to the UE group may transmit the PUSCH at different timing in the same transmission window, or may transmit the PUSCH in different transmission bands.

The UE starts a backoff timer through the CCA if a channel is busy. After the backoff timer expires, a channel state of the CCA is confirmed again, and UL transmission is performed if the channel is idle. The backoff timer may be defined by using the number of times of entering a channel idle state, a time duration in which the channel idle state is maintained, or the like.

If a value of the backoff timer is randomly defined, there may be an increase in uncertainty for a time at which the BS detects the PUSCH. Therefore, the BS may provide the UE with information regarding the backoff timer. The backoff timer information may include at least any one of a backoff timer value, a minimum/maximum backoff timer, and a parameter required to generate the backoff timer value. Information regarding the backoff timer may be included in a UL grant or may be given by MAC/RRC signaling. Alternatively, the UE may determine the backoff timer value on the basis of a cell ID, a UE ID, a subframe index, or a transmission window.

The time window may be defined by excluding a duration for DL synchronization/measurement (e.g., discovery RS (DRS) transmission) and/or a duration for broadcast transmission. During the time window scheduled by the BS, the UE may not perform PUSCH transmission and an operation related to the PUSCH transmission. However, during the time window, the UE may continuously perform a CCA operation.

Figure 4:
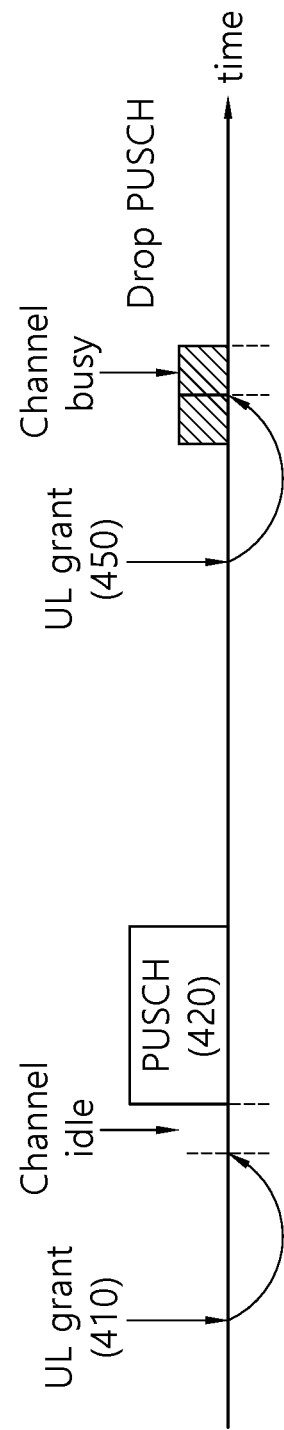
FIG. 4 shows another example of UL transmission in an unlicensed band.

FIG. 4 shows another example of UL transmission in an unlicensed band.

A UE transmits a PUSCH after PUSCH scheduling is achieved from a BS or when a channel idle state is detected by performing CCA at a scheduled PUSCH transmission time. If it is not the channel idle state, PUSCH transmission may be dropped or delayed.

The UE receives a UL grant 410. After a specific time (e.g., 4 subframes) elapses, the UE confirms a channel state, and if the channel is idle, transmits a PUSCH 420. If the channel is not idle, PUSCH transmission may be dropped.

In UL transmission of FIG. 3 or FIG. 4, the BS may schedule PUSCH transmission for a plurality of UEs. This is because one UE which succeeds in CCA among the plurality of UEs can transmit a PUSCH. However, the plurality of UEs which have recognized that a channel is idle may simultaneously attempt UL transmission, which may result in occurrence of a collision.

A method for reducing the collision based on transmission of a plurality of PUSCHs by the plurality of UEs is proposed.

Figure 5:
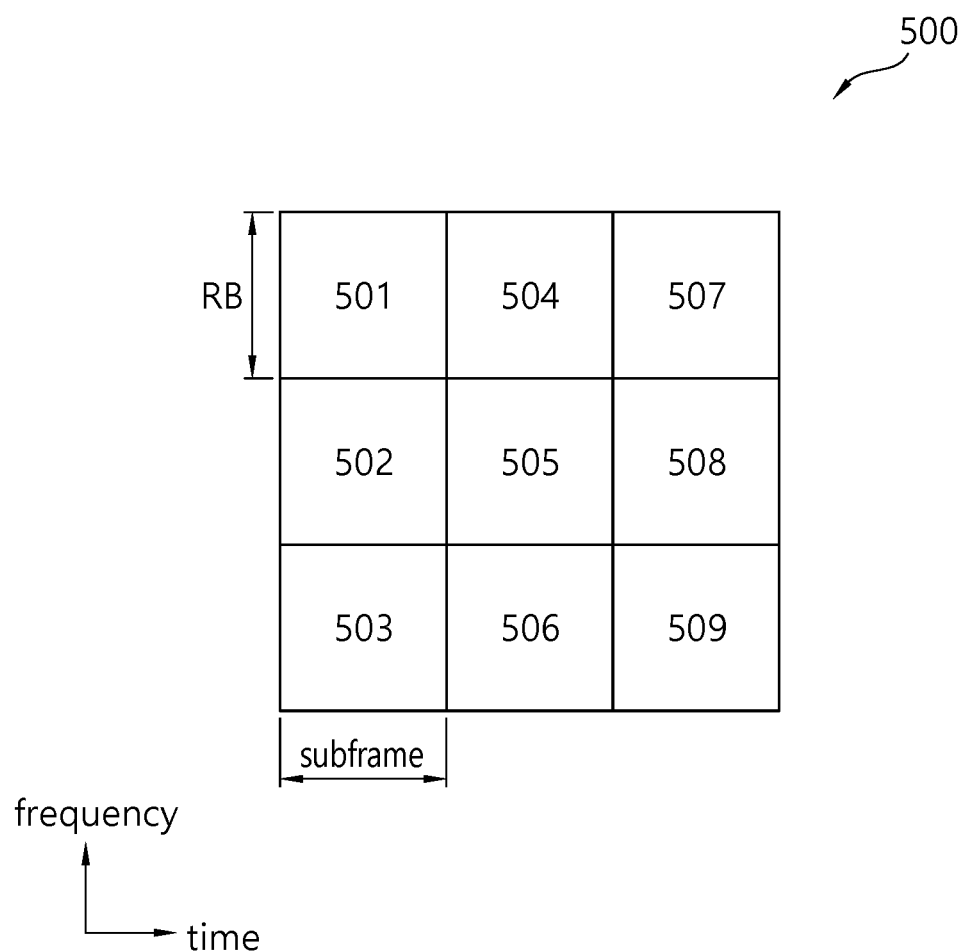
FIG. 5 shows resource allocation according to an embodiment of the present invention.

FIG. 5 shows resource allocation according to an embodiment of the present invention.

A BS allocates a main-pool 500 for a UL access to each UE or each UE group. The main-pool 500 may include a time resource, a frequency resource, a code resource, and/or a combination thereof. The main-pool 500 may include one or more subframes and/or one or more resource blocks (RBs). The RB may include one or more subcarriers.

The main-pool 500 is divided into a plurality of sub-pools 501, . . . , 509. The sub-pool may be a sub-group of a time-frequency-code resource of the main-pool.

When it is assumed that the main-pool 500 includes 3 subframes and each subframe includes 3 RBs, it is shown for example that each of the sub-pools 501, . . . , 509 occupies one RB in each subframe.

The main-pool may be given in advance through RRC signaling or the like. Alternatively, the main-pool may be given whenever UL transmission starts.

The UE may perform CCA for each sub-pool in the main-pool, and may transmit a PUSCH by using a sub-pool which has succeeded in the CCA. For example, the UE may perform the CCA on each of the sub-pools 501, . . . , 509 at a start time of each subframe, and when a corresponding sub-pool is idle, may perform UL transmission by using the idle sub-pool. Alternatively, the UE may perform the CCA at the start time of each subframe, and if the CCA is successful, may perform UL transmission by using all sub-pools or a selected sub-pool in a corresponding subframe.

In order to decrease a probability that a plurality of UEs select the same UL resource, the UE may randomly select one of the plurality of sub-pools. A random seed may include a UE identifier, a cell identifier, a subframe number, an RB number, a radio frame number, and/or a combination thereof.

Even when the UE transmits the PUSCH by using the main-pool or the sub-pool, another UE may attempt PUSCH transmission by using the same main-pool or the same sub-pool, which may result in a collision. When a transmission collision occurs between the UEs, a method of identifying the UE and operating HARQ is proposed as follows.

Figure 6:
FIG. 6 shows an example of a physical uplink shared channel (PUSCH) transmission for identifying a user equipment (UE).

FIG. 6 shows an example of PUSCH transmission for identifying a UE.

When a plurality of UEs attempt a UL access in a main-pool, it may be necessary for a BS to identify which UE succeeds in CCA to transmit a PUSCH. Even when the UE transmits the PUSCH by using a sub-pool selected from a plurality of sub-pools, the BS may need to identify the used sub-pool.

The UE transmits a preamble before the PUSCH is transmitted. The preamble is used when the BS identifies the UE and/or the sub-pool. The preamble may be generated on the basis of a UE ID (e.g., a cell-radio network temporary identifier (C-RNTI)) and/or a sub-pool index. The preamble may be pre-designated for each UE or for each sub-pool.

A plurality of preamble candidates may be configured. Among the plurality of preamble candidates, the UE may transmit a randomly selected preamble. This is to prevent another UE from transmitting the same preamble.

Instead of the preamble, a reference signal (RS) for a PUSCH may be associated with the UE ID and/or the sub-pool index. Alternatively, the RS for the PUSCH may be associated with the UE ID and/or the sub-pool index together with the preamble.

The preamble may be transmitted at a predetermined bandwidth regardless of a frequency band at which the PUSCH is transmitted.

Figure 7:
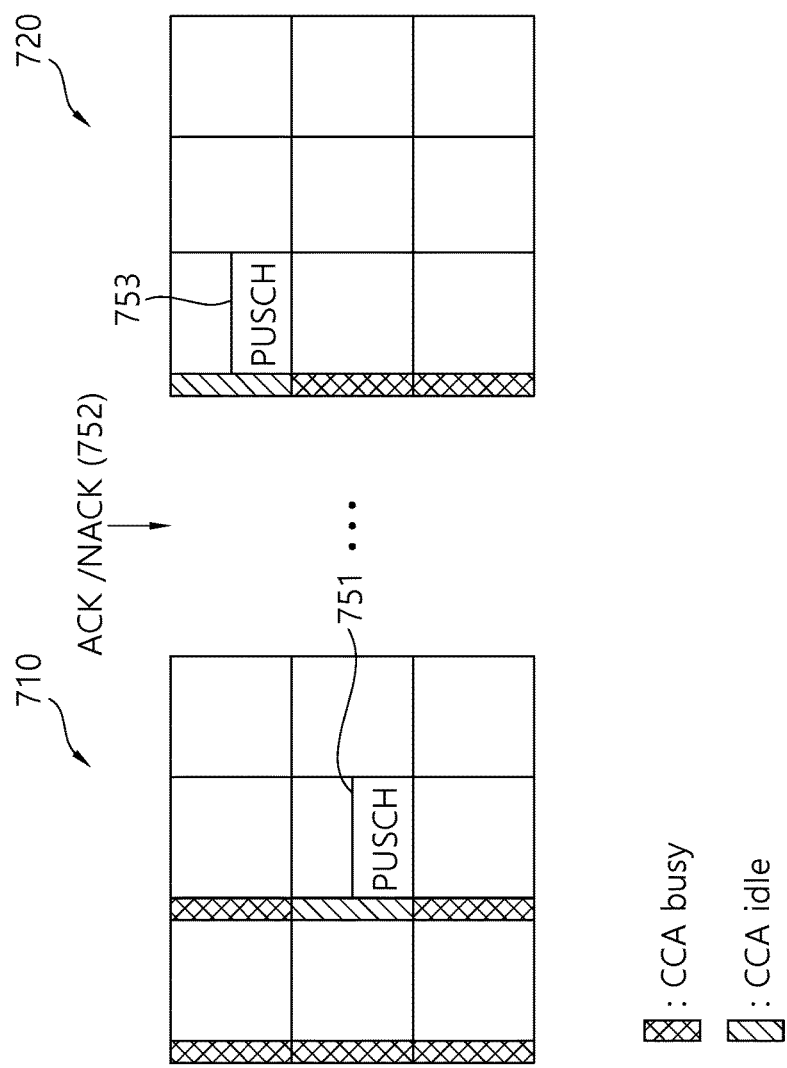
FIG. 7 shows a hybrid automatic repeat request (HARQ) method according to an embodiment of the present invention.

FIG. 7 shows an HARQ method according to an embodiment of the present invention.

It is assumed that a first main-pool 710 for initial transmission is allocated to a UE. The first main-pool 710 includes a plurality of sub-pools. The UE may perform CCA for each sub-pool to transmit a PUSCH 751 by using an idle sub-pool.

The UE receives an ACK/NACK signal 752 for a PUSCH 751 from a BS. The ACK/NACK signal 752 is a confirmation signal for informing whether the PUSCH 751 is successfully received. The ACK/NACK signal may include a NACK signal indicating a reception failure and/or an ACK signal indicating a reception success. Alternatively, the BS may not transmit the NACK signal, and may transmit the ACK signal only when the reception is successful. The ACK/NACK signal 752 may be transmitted through a licensed cell.

Upon receiving the ACK signal, the UE stops transmission of a transport block (TB) corresponding to the PUSCH. The UE which has failed in the reception of the ACK signal or which has received the NACK signal may continuously attempt transmission of a corresponding TB through a PUSCH 753 on the basis of the existing main-pool 710 or a newly allocated main-pool 720.

The UE may determine a redundancy version (RV) of a TB to be retransmitted as follows.

(1) When the BS transmits the ACK/NACK signal (1-1) A UE which has received the NACK signal updates an RV for corresponding TB transmission, and a UE which has failed in reception of the ACK/NACK signal does not update the RV for the TB transmission.

(1-2) The UE which has received the NACK signal and the UE which has failed in reception of the ACK/NACK signal do not update the RV for the TB transmission.

(1-3) The UE which has received the NACK signal and the UE which has failed in reception of the ACK/NACK signal update the RV for the TB transmission.

(1-4) The UE which has received the NACK signal updates the RV for the TB transmission, and the UE which has failed in reception of the ACK/NACK signal updates the RV only when previous transmission of the TB is not initial transmission.

(1-5) The UE which has received the NACK signal and the UE which has failed in reception of the ACK/NACK signal update the RV only when previous transmission of the TB is not initial transmission.

(2) When the BS transmits only the ACK signal (2-1) The UE which has failed in reception of the ACK signal does not update the RV for the TB transmission.

(2-2) The UE which has failed in reception of the ACK signal updates the RV only when previous transmission of the TB is not initial transmission.

(2-3) The UE which has failed in reception of the ACK signal updates the RV.

(3) The ACK/NACK signal is not applied to PUSCH transmission which performs CCA in an unlicensed band. That is, retransmission for a PUSCH for performing the CCA is directly scheduled by the BS, and transmission of an additional ACK/NACK signal is not required.

In the aforementioned HARQ method, the ACK/NACK signal may be transmitted through DCI on a downlink control channel (e.g., PDCCH or EPDCCH). The DCI may include a plurality of ACK/NACK signals for a plurality of UEs. This is called multiplexed DCI. Each UE may identify the ACK/NACK signal corresponding thereto according to a location of the plurality of ACK/NACK signals in the multiplexed DCI. Alternatively, the multiplexed DCI may include identification information of each UE and/or information regarding a preamble/RS/sub-pool on which a corresponding PUSCH is transmitted. The identification information of each UE and/or the information regarding the preamble/RS/sub-pool on which the corresponding PUSCH is transmitted may be masked or associated with CRC of the multiplexed DCI. A location of the ACK/NACK signal may be determined in association with the UE identification information or the preamble/RS/sub-pool on which the corresponding PUSCH is transmitted.

Figure 8:
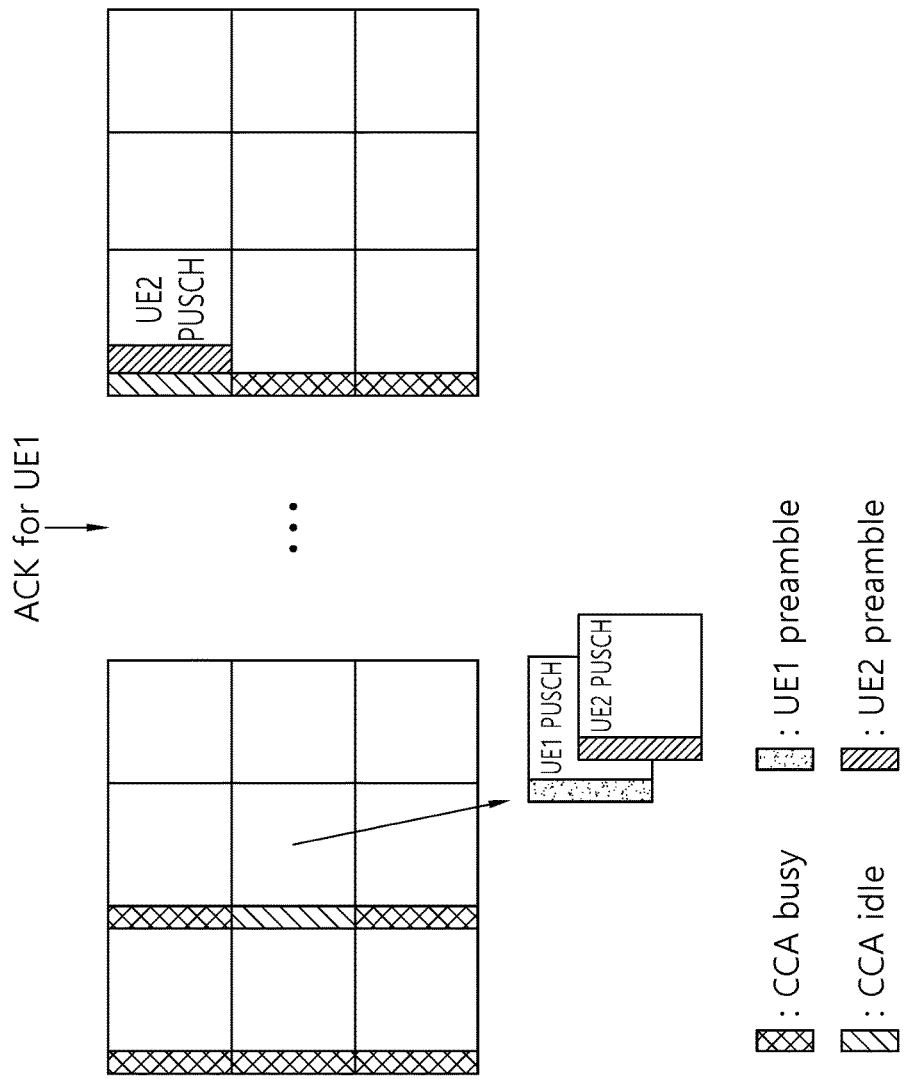
FIG. 8 shows an HARQ method according to anther embodiment of the present invention.

FIG. 8 shows an HARQ method according to anther embodiment of the present invention.

It is assumed that, in a main-pool scheduled for initial transmission, a UE1 and a UE2 simultaneously succeed in CCA in the same sub-pool. The UE1 and the UE2 transmit respective PUSCHs by using the same sub-pool. A preamble for identifying the UE may be transmitted before a PUSCH.

Only the UE1 receives ACK from a BS. The ACK may include identification information for the UE1.

Upon receiving the ACK, the UE1 stops retransmission. Only the UE2 may retransmit the PUSCH on a main-pool scheduled for transmission.

If ACK/NACK for the PUSCH is transmitted in a DCI format (this is called ACK DCI), the ACK DCI may include information for retransmission. If the ACK/NACK in the ACK DCI indicates NACK (or retransmission), information such as a radio resource (or main-pool), CCA parameter, code rate, RV, or the like to be applied to PSUCH retransmission may be further included. ACK DCI having only ACK/NACK and ACK DCI having ACK/NACK and retransmission information may have different formats and sizes. The UE may independently attempt detection on each ACK DCI.

The BS may transmit indication information for stopping/resuming PUSCH transmission, a PUSCH transmission probability, and/or information for adjusting a CCA parameter to each UE or each UE group. The information may be included in ACK DCI or additional DCI. This may be effective when channel congestion is increased due to an increase in the number of UEs.

The BS may allow contention-based PUSCH transmission, contention-based PUSCH retransmission, and contention-based PUSCH initial transmission or may transmit a resource to be used for corresponding transmission and information for adjusting a CCA parameter. This information may be included in the DCI.

The contention-based PUSCH transmission in which PUSCH transmission starts after the CCA is performed may be applied only to initial transmission or retransmission.

If UL transmission using a contention-based resource collides with UL transmission directly scheduled for the UE by the BS, the directly scheduled UL transmission may be preferentially performed. For example, in a subframe in which contention-based UL semi-persistent scheduling (SPS) transmission is allowed through RRC signaling or the like, if PUSCH transmission is triggered by a UL grant, the UE may transmit the scheduled PUSCH by ignoring SPS transmission. Since PUSCH retransmission based on a NACK signal may relatively have a priority in order to complete UL transmission of a TB, the UE may perform PUSCH retransmission based on an ACK/NACK signal by ignoring SPS transmission.

ACK DCI may include an ACK/NACK signal for a plurality of PUSCHs belonging to different HARQ processes. The ACK DCI may include a plurality of ACK/NACK signals for the plurality of HARQ processes together with a UE identifier. An HARQ process number for each ACK/NACK signal may be included in the ACK DCI. The UE may identify the HARQ process number on the basis of a location of the ACK/NACK signal in the ACK DCI.

The ACK DCI may include an ACK/NACK signal for each sub-pool in a main-pool for each UE. The ACK DCI may include a sub-pool index for each ACK/NACK signal. The UE may identify the sub-pool on the basis of the location of the ACK/NACK signal in the ACK DCI. The ACK DCI may include ACK/NACK information for the plurality of UEs or the plurality of PUSCHs. The ACK DCI may be transmitted in unit of a main-pool scheduled by the BS.

Figure 9:
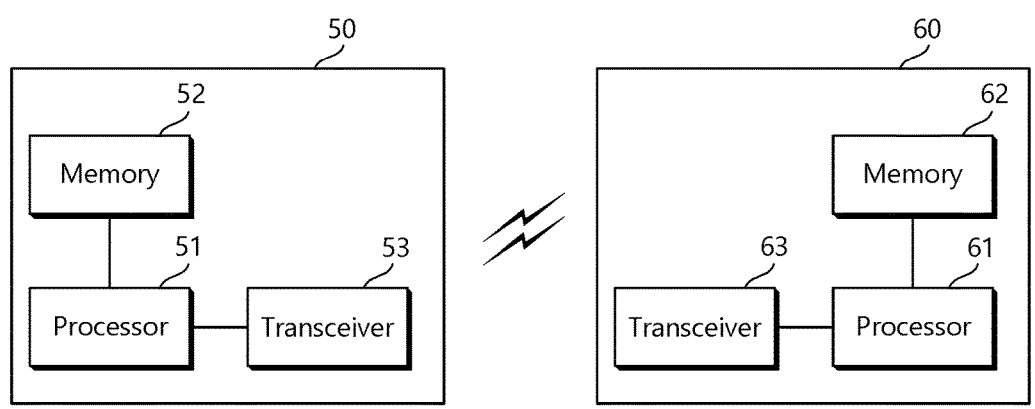
FIG. 9 is a block diagram showing a wireless communication system according to an embodiment of the present invention.

FIG. 9 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for uplink transmission in a wireless communication system, the method comprising:
   receiving, by a wireless device, information regarding a main-pool for uplink transmission in an unlicensed band from a base station;

determining, by the wireless device, an idle sub-pool by performing clear channel assessment (CCA) on a plurality of sub-pools in the main-pool in the unlicensed band;

transmitting, by the wireless device, an uplink transport block to the base station by using the determined idle sub-pool in the unlicensed band; and receiving, by the wireless device, an acknowledgement (ACK)/not-acknowledgement (NACK) signal for the uplink transport block from the base station, wherein the ACK/NACK signal is included in downlink control information (DCI), and wherein the DCI further includes information for stopping the uplink transport block, resuming the uplink transport block, an uplink transmission probability and/or information for adjusting a CCA parameter used for a contention based uplink transmission, a contention based uplink retransmission, and a contention based uplink initial transmission.

2. The method of claim 1, further comprising:
randomly selecting, by the wireless device, a sub-pool for performing the CCA from the plurality of sub-pools.

3. The method of claim 1, wherein the main-pool comprises a plurality of subframes.

4. The method of claim 3, wherein the CCA is performed at a start time of each of the plurality of subframes.

5. The method of claim 1, further comprising:
transmitting a preamble used to identify the sub-pool before the uplink transport block.

6. The method of claim 5, wherein the preamble is generated based on an identifier of the wireless device.

7. A device for uplink transmission in a wireless communication system, the device comprising:
a transceiver configured to transmit and receive a radio signal; and
a processor operatively coupled to the transceiver and configured to:
control the transceiver to receive information regarding a main-pool for uplink transmission in an unlicensed band from a base station;
determine an idle sub-pool by performing clear channel assessment (CCA) on a plurality of sub-pools in the main-pool in the unlicensed band;
control the transceiver to transmit an uplink transport block to the base station by using the determined idle sub-pool in the unlicensed band; and
control the transceiver to receive an acknowledgement (ACK)/not-acknowledgement (NACK) signal for the uplink transport block from the base station;
wherein the ACKJNACK signal is included in downlink control information (DCI), and
wherein the DCI further includes information for stopping the uplink transport block, resuming the uplink transport block, an uplink transmission probability and/or information for adjusting a CCA parameter used for a contention based uplink transmission, a contention based uplink retransmission, and a contention based uplink initial transmission.

8. The device of claim 7, wherein the processor is configured to randomly select a sub-pool for performing the CCA from the plurality of sub-pools.

* * * * *